(12) United States Patent
Trudel et al.

(10) Patent No.: US 12,374,954 B2
(45) Date of Patent: Jul. 29, 2025

(54) ELECTRIC AXLE WITH DIRECT ROTOR AND HEAD SPRAY COOLING

(71) Applicant: DANA TM4 INC., Boucherville (CA)

(72) Inventors: Carl Trudel, Boucherville (CA); Steven Vanhee, Hooglede (BE); Luke Miller, Montreal (CA)

(73) Assignee: DANA TM4 INC., Boucherville (CA)

( * ) Notice: Subject to any disclaimer, the term of this patent is extended or adjusted under 35 U.S.C. 154(b) by 253 days.

(21) Appl. No.: 17/661,473

(22) Filed: Apr. 29, 2022

(65) Prior Publication Data

US 2022/0352782 A1 Nov. 3, 2022

Related U.S. Application Data

(60) Provisional application No. 63/182,720, filed on Apr. 30, 2021.

(51) Int. Cl.
*H02K 5/20* (2006.01)
*B60K 1/00* (2006.01)
(Continued)

(52) U.S. Cl.
CPC .............. *H02K 5/203* (2021.01); *B60K 1/00* (2013.01); *B60K 11/02* (2013.01); *H02K 5/15* (2013.01); *H02K 5/18* (2013.01); *H02K 5/20* (2013.01); *H02K 9/193* (2013.01); *B60K 2001/001* (2013.01); *B60K 2001/006* (2013.01)

(58) Field of Classification Search
CPC ............ H02K 5/203; H02K 5/15; H02K 5/18; H02K 9/193; H02K 7/006; H02K 7/116; H02K 9/19; H02K 11/33; H02K 5/04; H02K 1/32; B60K 11/02; B60K 2001/00; B60K 1/00; B60K 2001/001; Y02T 10/64; B60B 35/00
See application file for complete search history.

(56) References Cited

U.S. PATENT DOCUMENTS 8,558,422 B2 10/2013 Baumann et al.
2013/0002064 A1 * 1/2013 De Bock ................ H02K 9/197
310/54

(Continued)

FOREIGN PATENT DOCUMENTS

DE 102016217120 A1 * 3/2018
GB 2506970 A 4/2014

OTHER PUBLICATIONS

DE102016217120A1 English translation (Year: 2024).*

(Continued)

*Primary Examiner* — Christopher M Koehler
*Assistant Examiner* — Viswanathan Subramanian
(74) *Attorney, Agent, or Firm* — McCoy Russell LLP

(57) ABSTRACT

Methods and systems are provided for an electric axle in a vehicle. The electric axle comprises an electric motor having a stator and a rotor, a coolant manifold mounted to an end plate of the rotor, wherein the coolant manifold is configured to flow coolant to rotor coolant lines extending axially through the rotor, and a spray ring comprising coolant lines coupled to the coolant manifold, wherein coolant flowing from the coolant manifold to the spray ring flows in a direction angled to an axial direction, wherein the spray ring is positioned circumferentially about axial stator end windings.

18 Claims, 12 Drawing Sheets

(51) Int. Cl.
    *B60K 11/02*     (2006.01)
    *H02K 5/15*     (2006.01)
    *H02K 5/18*     (2006.01)
    *H02K 9/193*     (2006.01)

(56) References Cited

U.S. PATENT DOCUMENTS

| | | | |
|---|---|---|---|
| 2019/0273420 A1* | 9/2019 | Yasuda | H02K 1/20 |
| 2020/0204044 A1* | 6/2020 | Lee | H02K 1/20 |
| 2020/0227964 A1* | 7/2020 | Ronning | H02K 1/2733 |
| 2020/0247236 A1* | 8/2020 | Hirao | B60K 17/046 |

OTHER PUBLICATIONS

Rossia, G., "Deliverable 2.3 Development and integration of the e-Axle subsystem," sys2wheel Website, Available Online at https://sys2wheel.eu/wp-content/uploads/2021/02/public_fpt_eaxlesubsystem.pdf, Available as Early as Jun. 30, 2020, 14 pages.

* cited by examiner

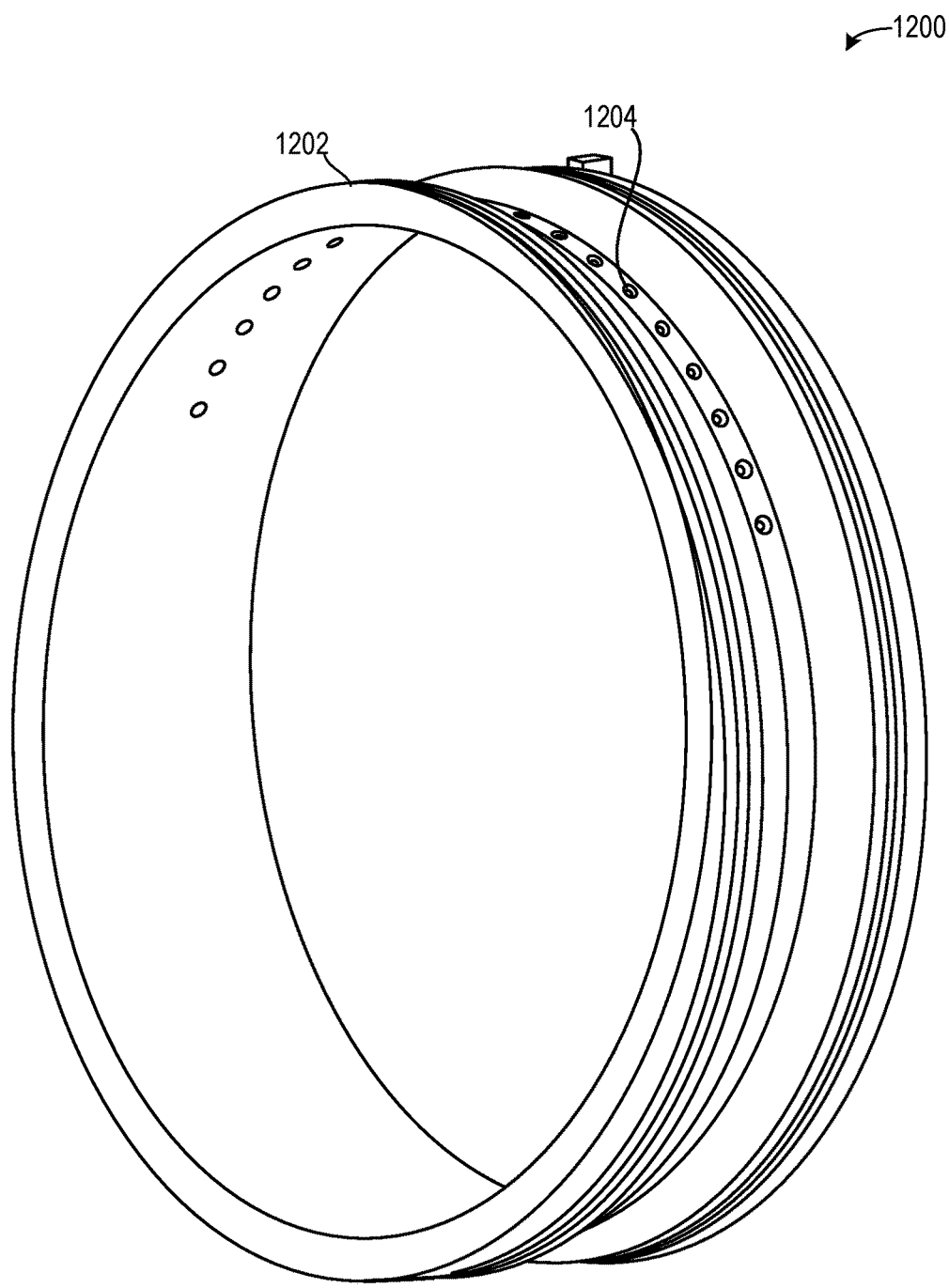
FIG. 12
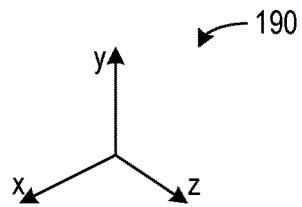

ELECTRIC AXLE WITH DIRECT ROTOR AND HEAD SPRAY COOLING

CROSS REFERENCE TO RELATED APPLICATION

The present application claims priority to U.S. Provisional Application No. 63/182,720, entitled "ELECTRIC AXLE WITH DIRECT ROTOR AND HEAD SPRAY COOLING", and filed on Apr. 30, 2021. The entire contents of the above-listed application are hereby incorporated by reference for all purposes.

TECHNICAL FIELD

The present description relates generally to methods and systems for an electric axle, and, in particular, methods and systems directed to cooling an electric traction motor of the electric axle.

BACKGROUND AND SUMMARY

Electric axle assemblies and powertrain and control/electronic systems connected thereto require cooling and thermal management so as to remove heat from various components to improve performance characteristics of such components.

Electric axle assemblies typically comprise opposing half shafts with a driven differential therebetween, with wheel ends or hubs on the outward ends of the half shafts and powertrain components connected to the driven differential for delivering rotational power to the differential and, accordingly, one or both of the half shafts. An electric axle assembly comprises an electric motor configured to drive, via gearing, one or more of the wheel ends, typically via driving the gears associated with the driven differential. The vehicle within which the electric axle may be positioned and configured further comprises drive wheels and other powertrain components, typically including coolant handling systems, control systems comprising electronic circuitry and one or more controllers configured for controlling the coolant handling systems, and other components. The one or more controllers may comprise one or more sensors and actuators configured for control of one or more coolants The electric motor (such as an electric traction motor drivably connected to the driven differential) comprises an inverter for converting DC energy from a source of DC energy such as DC voltage from a battery (that may further comprise a charging system connected or connectable thereto), the inverter converting the DC energy to AC energy inputs to a rotor and a stator of the electric motor. The rotor may comprise a rotating component connectable via gearing to the driven differential, and the stator may comprise a stationary component affixed to structure such as a casing or enclose or housing of the electric motor that may be fixedly connected to other non-rotating structure of a powertrain of a vehicle.

The inverter generates considerable heat and, accordingly, comprises coolant flow paths configured for receiving a coolant (such as for example, a coolant oil) for removing heat from the inverter electronic components (e.g., switches/power field effect transistors (power FETs)). The rotor and stator (configured for rotational movement between the two) generate considerable heat and, accordingly preferably comprise coolant flow paths configured for receiving a coolant (such as for example, a coolant oil) for removing heat from areas of the rotor generating heat (such as the areas of the rotor proximate to the stator), and for removing heat from areas of the stator generating heat (such as areas of the stator proximate to the rotor and, especially, windings associated with the stator through which electric energy is flowed so as to generate the rotative moments and rotation of the rotor relative to the stator).

In order to more effectively and efficiently remove heat from components of the electric axle, the present disclosure includes embodiments of an electric axle comprising an electric motor having a stator and a rotor, a coolant manifold mounted to an end plate of the rotor, wherein the coolant manifold is configured to flow coolant to rotor coolant lines extending axially through the rotor, and a spray ring comprising coolant lines coupled to the coolant manifold, wherein coolant flowing from the coolant manifold to the spray ring flows in a direction angled to an axial direction, wherein the spray ring is positioned circumferentially about axial stator end windings.

In various embodiments, an electric axle rotor and spray ring cooling system comprises combinations of the features disclosed herein.

In various embodiments, an electric motor comprises cooling features as described in the present disclosure.

In various embodiments, a method of cooling an electric motor used in an electric axle, comprising flowing a coolant as described in the present disclosure.

In various embodiments, the methods and systems to accomplish improved cooling includes any of the methods of cooling a rotor and/or stator of an electric motor as described and/or illustrated herein.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The advantages described herein will be more fully understood by reading an example of an embodiment, referred to herein as the Detailed Description, when taken alone or with reference to the drawings, where:

FIG. 12 shows an embodiment of the spray ring.

DETAILED DESCRIPTION

The present inventors determined problems with existing designs in terms of a lack of continuous power and torque leading to low power and torque density in such designs, with performance requirements such that an appropriately sized electric motor would not be able to fit within customer-desired package specifications. The present inventors discovered and determined the designs described herein, having two different direct cooling methods using oil working together. First, the (coolant fluid or) oil if fed to both front and back hairpin winding heads through two cooling rings inserted between the hairpin head outer diameter (OD) and the cooling jacket inner diameter (ID). Second, oil flowing through the rotor is sprayed from the rotor endplates to the hairpin heads inner diameter. This flow of oil is also used to cool the rotor lamination stacks and ensure a controlled magnet temperature. The oil is then flowing down by gravity and to a sump cavity, where an electrical pump and oil filtration feed the gear box or the gears/gear train may be cooled directly (see boundary diagram shown in FIG. 5).

Figure 1:
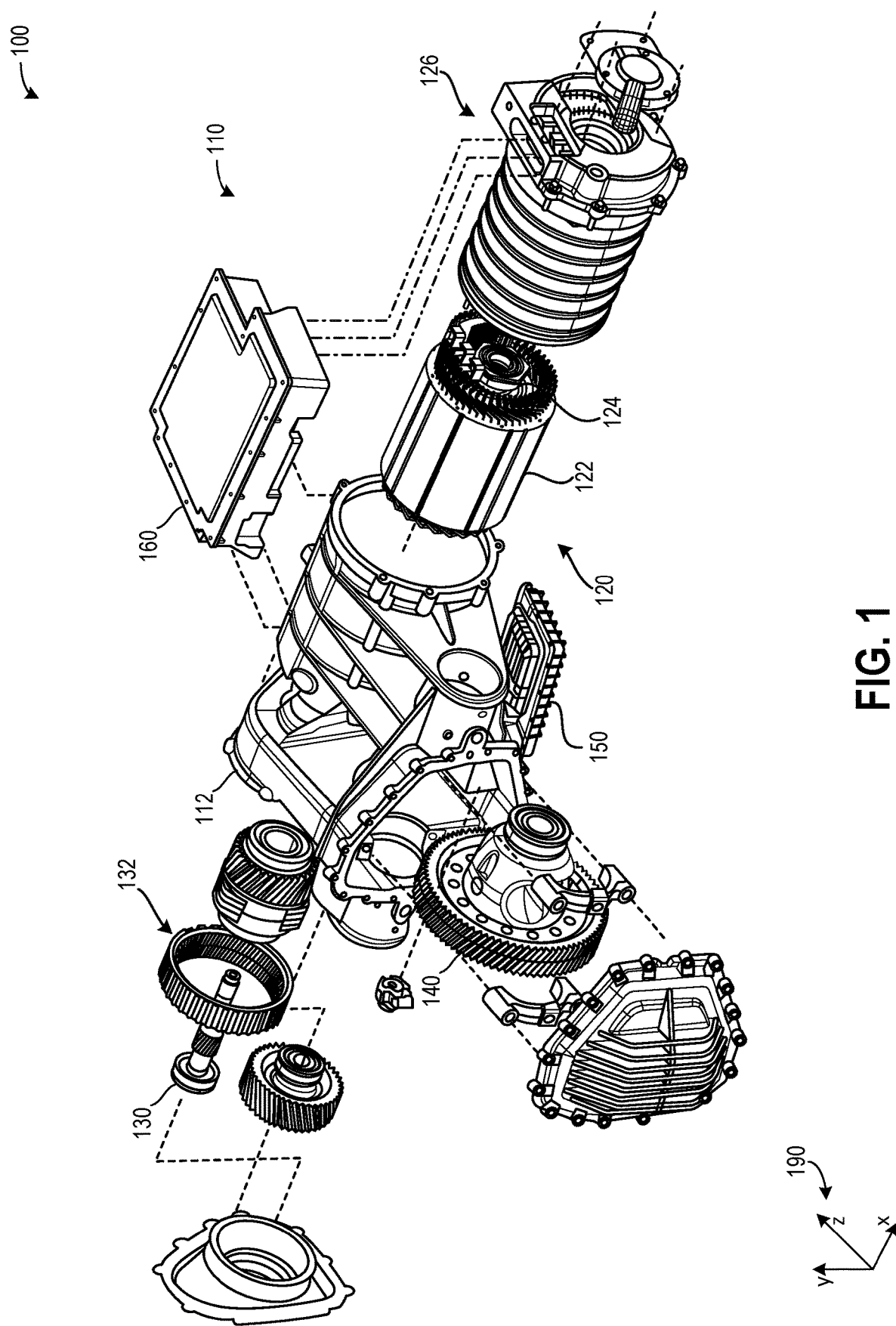
FIG. 1 shows an exploded view of a portion of an electric axle.

FIG. 1 shows an exploded view 100 of a portion of an electric axle 110, according to embodiments. As shown, an electric motor 120 comprising a (hairpin type) cylindrical stator 122 (core) and a rotor 124 positioned therein, may be enveloped by a cooling jacket 126. The cooling jacket 126 (with rotor and stator positioned therein) may be fit within the motor enclosure/housing 112. The channels shown circumferentially on the cooling jacket, combined with the inside surface of the enclosure/housing 112 (or carrier/case) provide paths for a coolant fluid (such as water or other coolant fluid composition) to flow across the circumferential surfaces of the cooling jacket, to thereby remove heat from the stator core positioned therewithin. Also as shown in the exploded view of FIG. 1, a drive shaft 130 of the electric motor (along the motor's axis of rotation) may be gearably connected to a differential 140, via gears 132 in such a manner as to drive half shafts (and wheel ends) drivably connected thereto. An inverter 150 is shown that may be affixed to the carrier/case 112, the inverter 150 providing electrical energy to the rotor 124 and stator 122.

Figure 2:
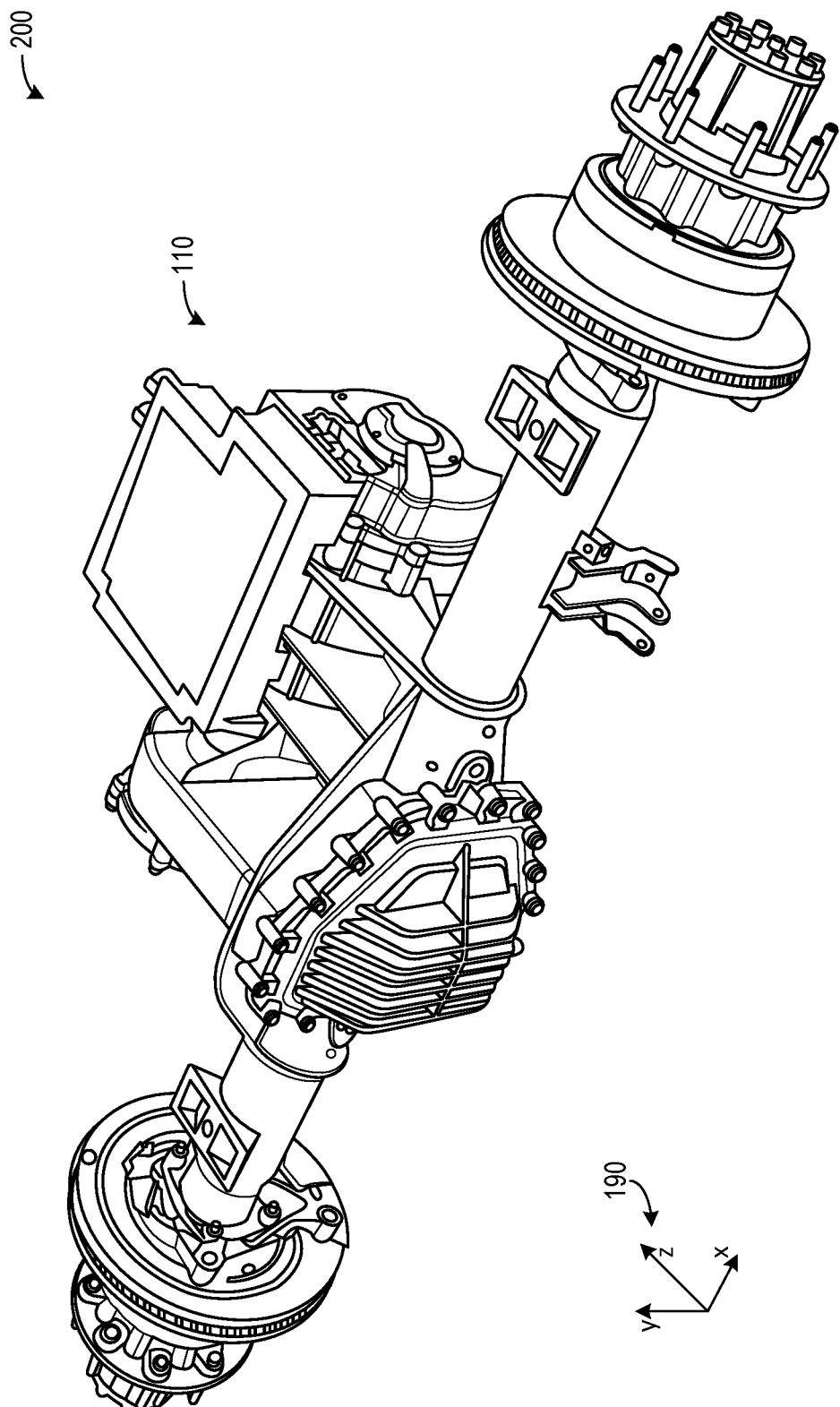
FIG. 2 shows an assembly of the electric axle.

FIG. 2 shows an assembly 200 of the electric axle 110, according to embodiments. As shown, an exemplary electric axle may comprise wheel ends, half shafts, a differential, and gears connected to the output shaft of an electric motor. As such, components previously introduced may be similarly numbered in this and subsequent figures.

Figure 3:
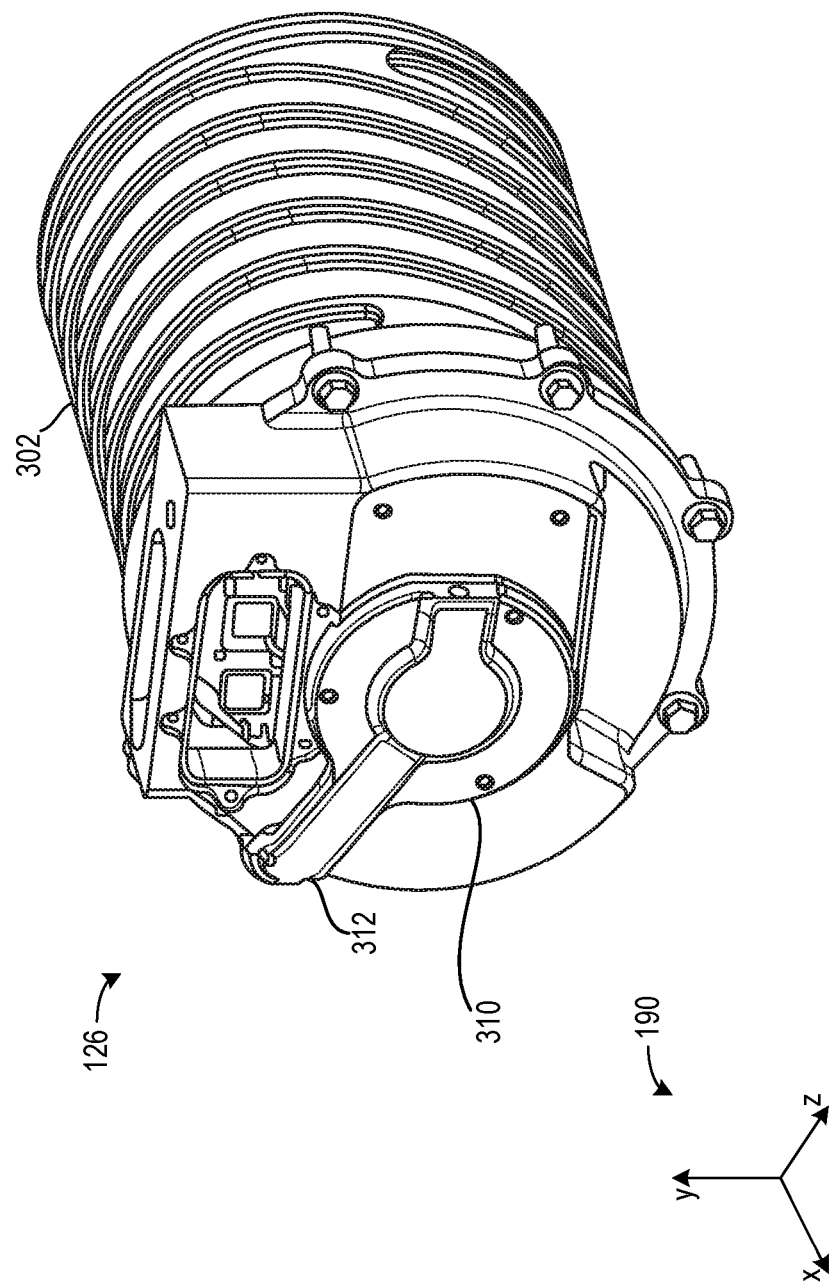
FIG. 3 shows an assembly of a cooling jacket of the electric axle.

FIG. 3 shows an embodiment 300 of the cooling jacket 126 as shown in FIG. 1, according to embodiments. The jacket is shown with circumferentially oriented ribs 302 that, when coupled with the interior surface of the carrier/case within which the jacket assembly insertably fits, create channels for coolant fluid to flow across the exterior surface of the cooling jacket 126, thereby removing heat therefrom (effectively pulling heat away from the stator core material surrounded by the cooling jacket). A coolant manifold 310 is shown on the end of the cooling jacket 126. In one example, the coolant manifold 310 is an end mounted coolant manifold. The end mounted coolant manifold 310 receives coolant fluid (such as oil) and supplies the oil to both a channel within the rotor shaft (for directly cooling the rotor) and a channel within the carrier/case (for supplying oil to a pair of cooling rings/spray rings situated proximate each end of the stator core so that the coolant oil may be sprayed radially inward onto the head outside diameter (or head OD, or end windings) of the stator.

The coolant manifold 310 may include a spray arm 312 extending radially outward from a center therefrom. A passage may extend from the center and through an entirety of the spray arm 312. The passage may flow coolant to multiple axial coolant passages arranged within the rotor and the cooling jacket 126.

Figure 4:
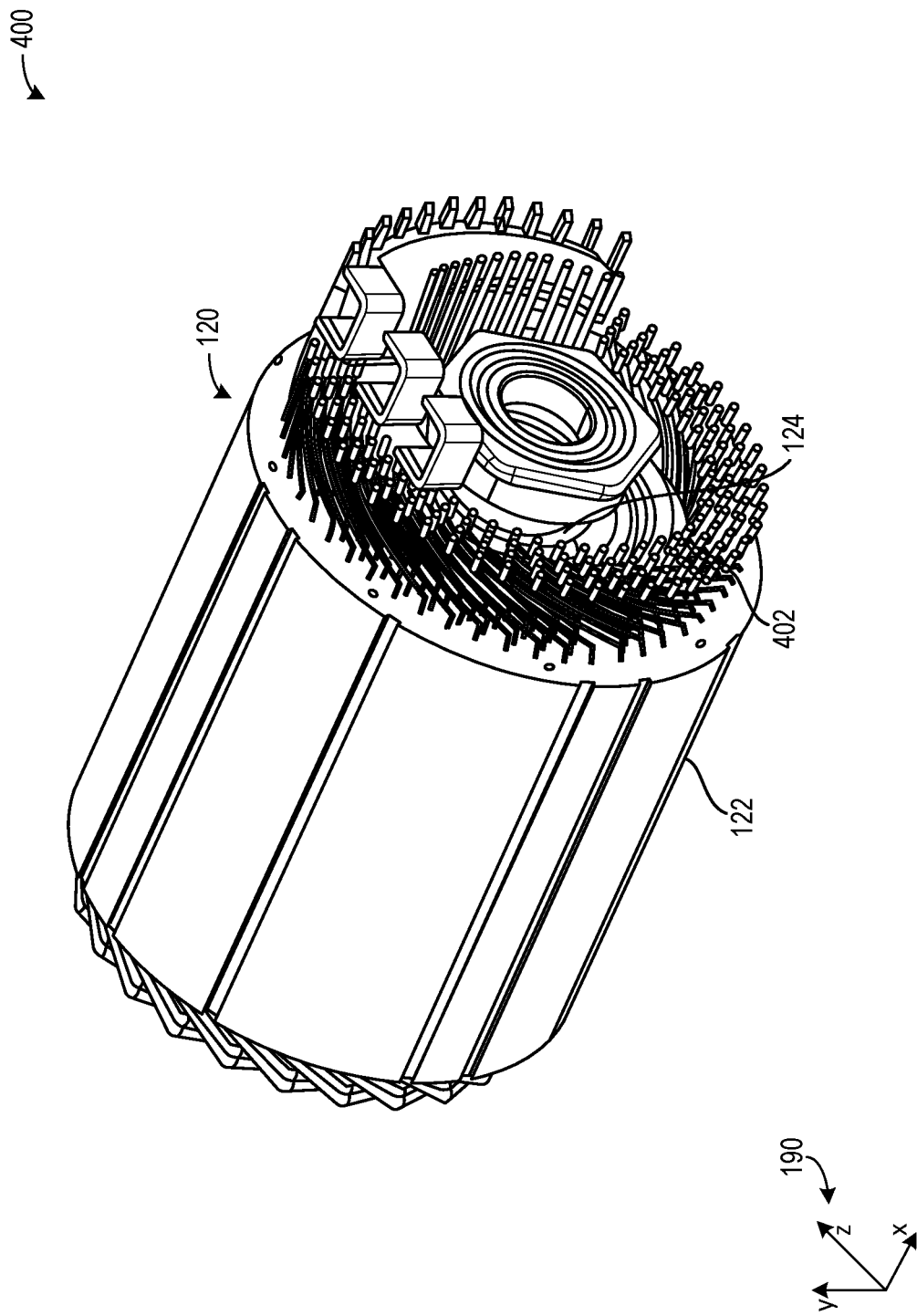
FIG. 4 shows an electric motor including a rotor positioned within a stator.

FIG. 4 shows the electric motor 120 including the rotor 124 positioned within the stator 122, as shown in the exploded view of FIG. 1, according to embodiments. The rotor is surrounded by the stator core. The stator may comprise hairpin windings 402 that, as shown, extend out of the stator core axially at each end, the extending portions of the windings referred to as end windings or stator head. The axially opposed end windings (or heads) each have an inside diameter (ID) and an outside diameter (OD).

Figure 5:
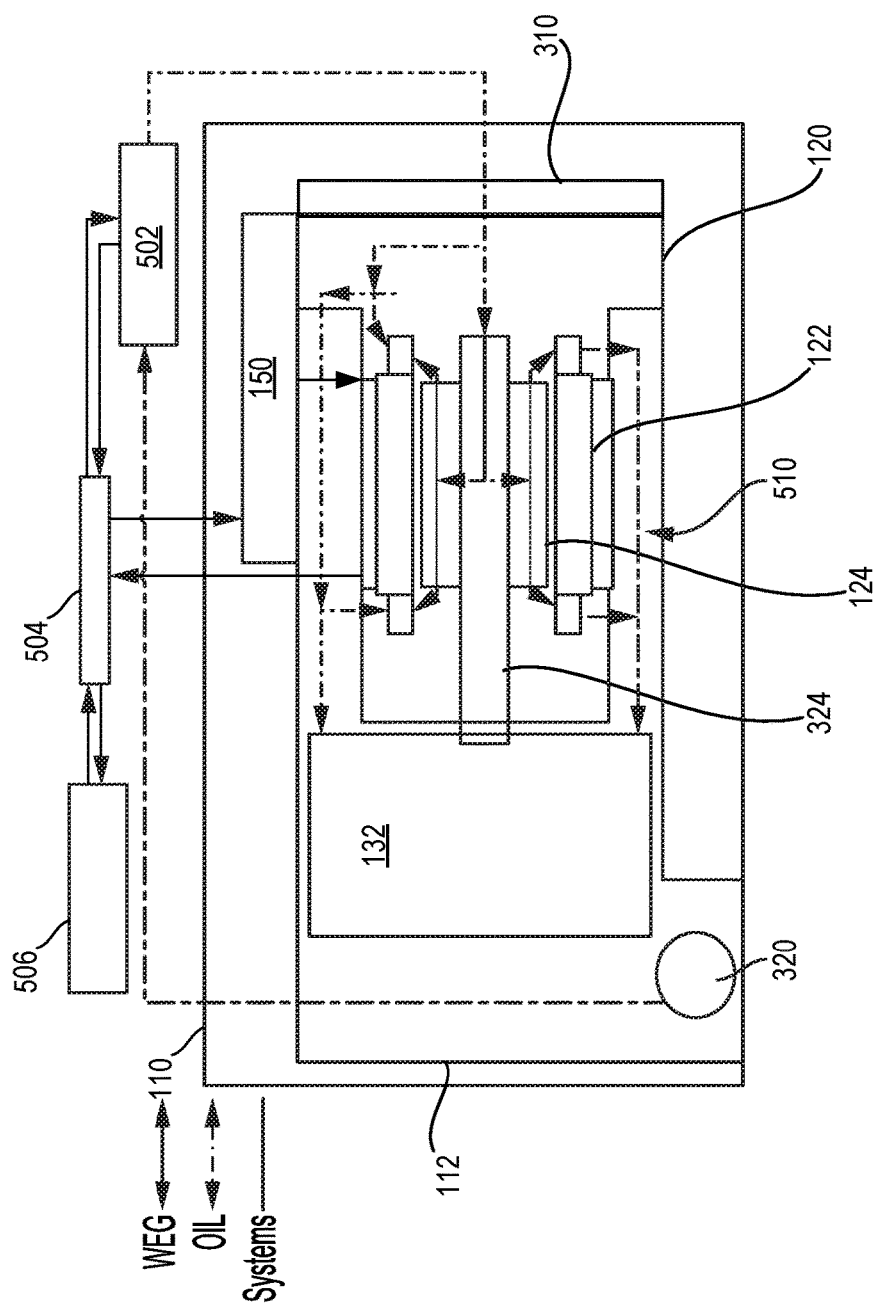
FIG. 5 shows a coolant flow block diagram.

FIG. 5 shows a block diagram 500 showing coolant flows, according to embodiments. The block diagram 500 shown comprises exemplary coolant flows and may be referred to as a boundary diagram. As shown, the e-axle 110 (electric axle) preferably comprises a carrier having a gear train 132 therewithin and having an inverter 150 atop the carrier 112, positioned immediately above the motor/traction motor 120 portion of the assembly. Oil (or coolant fluid) flows from a water to oil heat exchanger 502 into the end mount coolant feed manifold 310 (as in FIG. 3) to provide oil into channel in a rotor shaft 324. The oil entering the rotor shaft 324 preferably may flow to the middle of the rotor, axially mid-way between the rotor ends and stator end windings/heads, where the oil then flows through radially outward directed channels within the rotor 124 to channels running axially (parallel to the axis of rotation) along radially outward portions of the rotor 124 before exiting the rotor 124 via rotor end plates and orifices sized and directed therein to direct cooling oil onto the end windings inner diameter (head ID) thereby cooling the end windings ID. The oil then gravitationally flows downward to a motor sump 510 and potentially through portions of the gear train housing/cavity, where a pump 320 then sends the oil back to the water to oil heat exchanger (upper right in the diagram shown in FIG. 5).

From the coolant feed manifold (such as in FIG. 3), coolant oil is also (in addition to the rotor shaft channel) fed into the cooling rings/spray rings either directly via channels into the spray ring structure (for the spray ring proximate the coolant feed manifold) or (for the spray ring positioned between the carrier and/or cooling jacket and the stator end windings (head OD) axially opposite from the coolant feed manifold, the oil preferably flows through at least on channel in the carrier and is fed into the spray ring. Orifices/holes in the spray rings (such as those illustrated in FIG. 12) are preferably sized and directed/oriented so as to spray coolant oil onto the end windings OD (head OD).

In this way, coolant oil is used to both directly cool the rotor and the end windings ID, and cool the end windings OD via the cooling rings/spray rings. Further, a cooling is provided by the cooling jacket via water ethylene glycol (WEG) cooling lines 504. The cooling lines provide coolant (such as water) to the coolant jacket channels to thereby cool the circumferential surfaces surrounding the stator core. The WEG cooling lines 504 extend (as shown in FIG. 5) to the water to oil heat exchanger 502. The WEG cooling lines 504 may be coupled to a vehicle cooling system 506.

Figure 6:
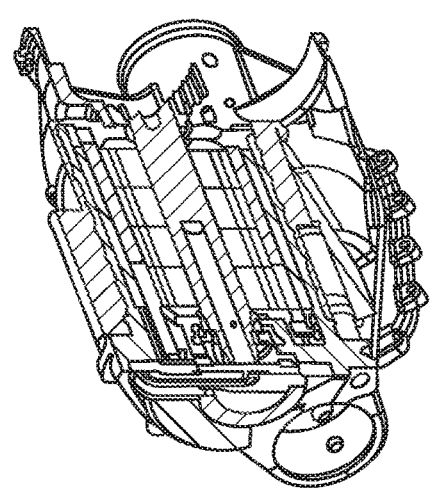
FIG. 6 shows a cross-sectional view of the electric motor taken along an x-y plane.
Figure 6:
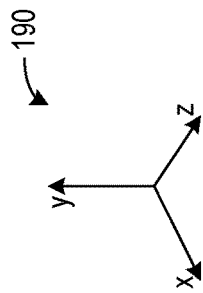

FIG. 6 is a cut view 600 of the electric motor 120, as shown in FIG. 1, according to embodiments. The motor may comprise the hairpin type stator 122 with hairpin connections at one (axial) end of the stator, and are referred to as end windings 402 (or the stator heads). Each of the hairpins may comprise hairpin wire/magnetic wire of rectangular cross-section. In one example, the electric motor 120 is an AC motor. The motor comprises what may be referred to as stator hybrid cooling, whereby cooling is accomplished using front and back end winding oil cooling, as well as WEG jacket cooling (for active length cooling along the axial exterior surfaces of the stator core, via the cooling jacket and the cooling fluid channels circumferentially disposed thereon). Further, rotor cooling (shown in FIG. 7) is provided via direct oil cooling of the rotor core (via cooling oil fed into the rotor shaft as previously described).

Figure 7:
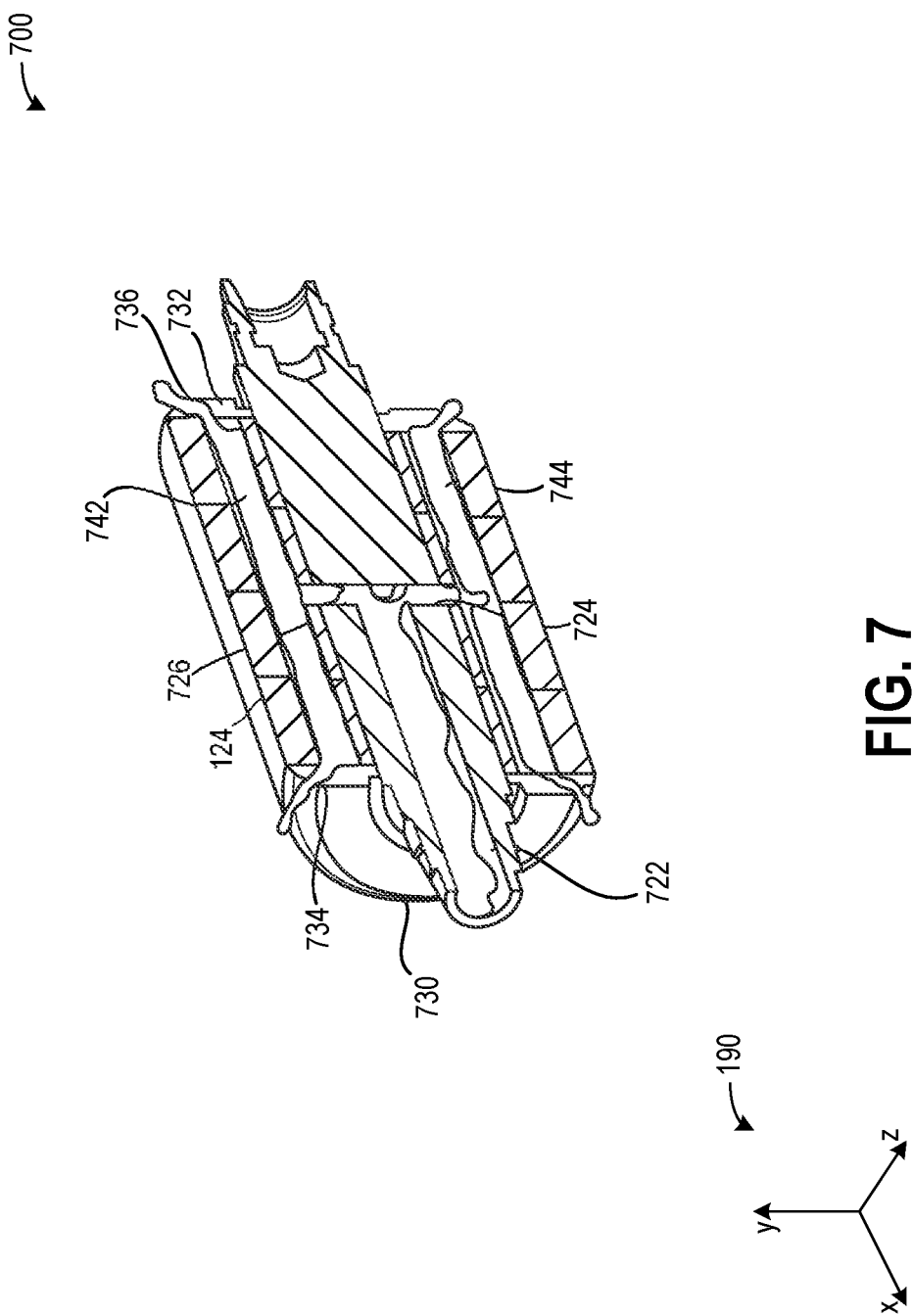
FIG. 7 shows a detailed view of a cooling of the rotor.

FIG. 7 shows a more detailed view 700 of the rotor cooling, according to embodiments. As previously described, cooling fluid (such as oil) is received into the rotor shaft 324 as shown. The channel extends to the mid-point between the axial ends of the rotor shaft 324, whereafter radial channels 724, 726 permit cooling oil to travel radially outward into axially oriented channels 742, 744 running axially toward the axial ends of the rotor 124. End plates 730 and 732 with holes/orifices 734, 736 permit the oil to be sprayed outward and radially outward onto the head ID/end windings inside diameter. The rotor shaft 324 may include a rotor shaft passage 722 extending in an axial direction toward the radial channels 724, 726. The rotor shaft passage 722 may be fluidly coupled to the coolant manifold.

Figure 8:
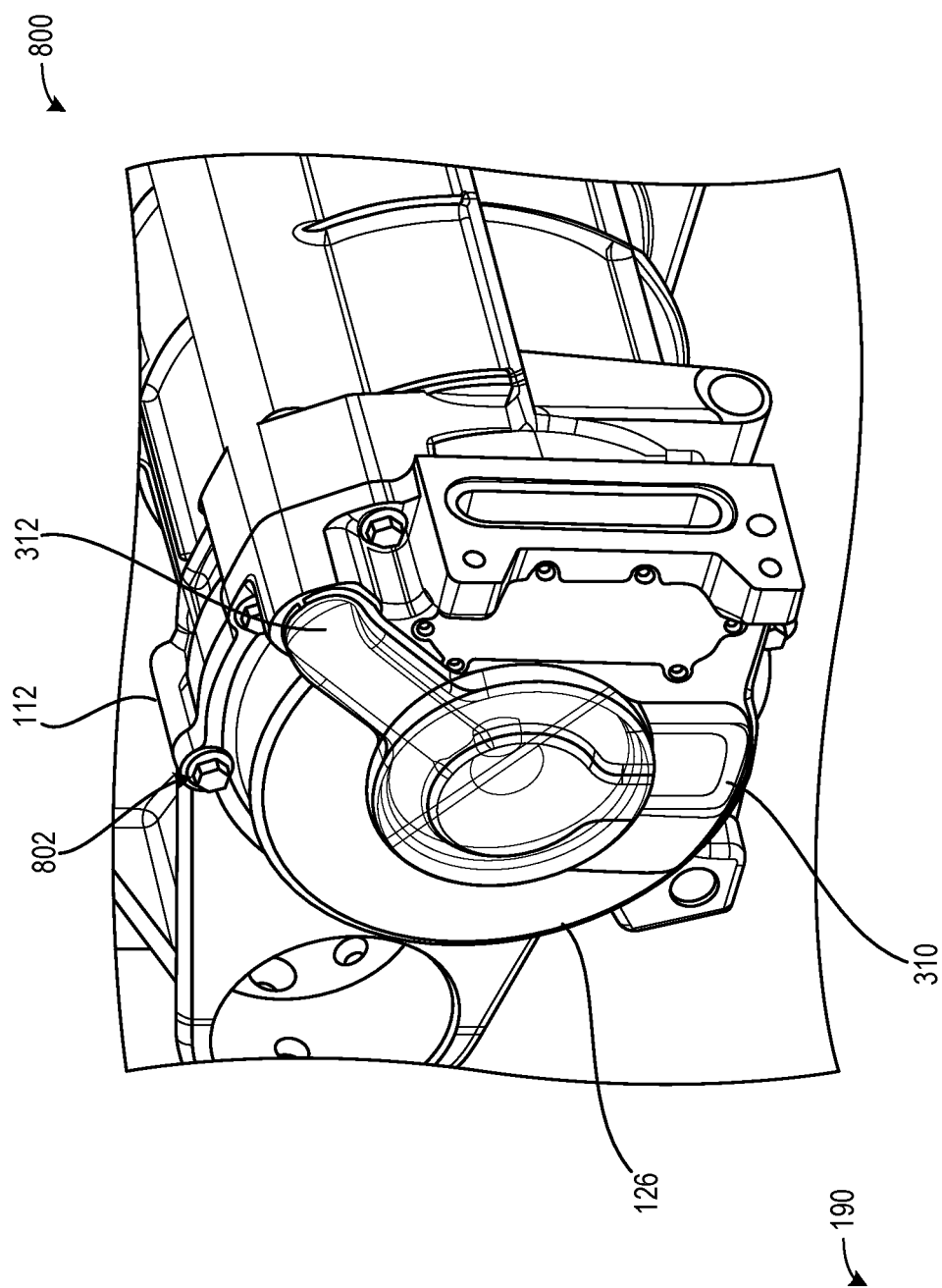
FIG. 8 shows a view of a coolant manifold coupled to the cooling jacket.

FIG. 8 shows a closer detail perspective view 800 of the end mounted coolant manifold 310 (or rotor coolant feed manifold, or rotor and spray ring coolant feed manifold) assembled to the cooling jacket as in FIG. 3 and further assembled into the outer case/enclosure housing shown in the exploded view of FIG. 1, according to embodiments. As illustrated, the coolant manifold 310 is inserted into the cooling jacket 126, wherein the cooling jacket 126 is physically coupled the housing 112 via a plurality of fasteners 802. The cooling jacket 126 further comprises an interface 804 which is configured to couple to a housing cover, such as housing cover 160 of FIG. 1. The radial arm 312 extends in a direction toward a gear train (e.g., gears 132) and is adjacent to the interface 804.

Figure 9:
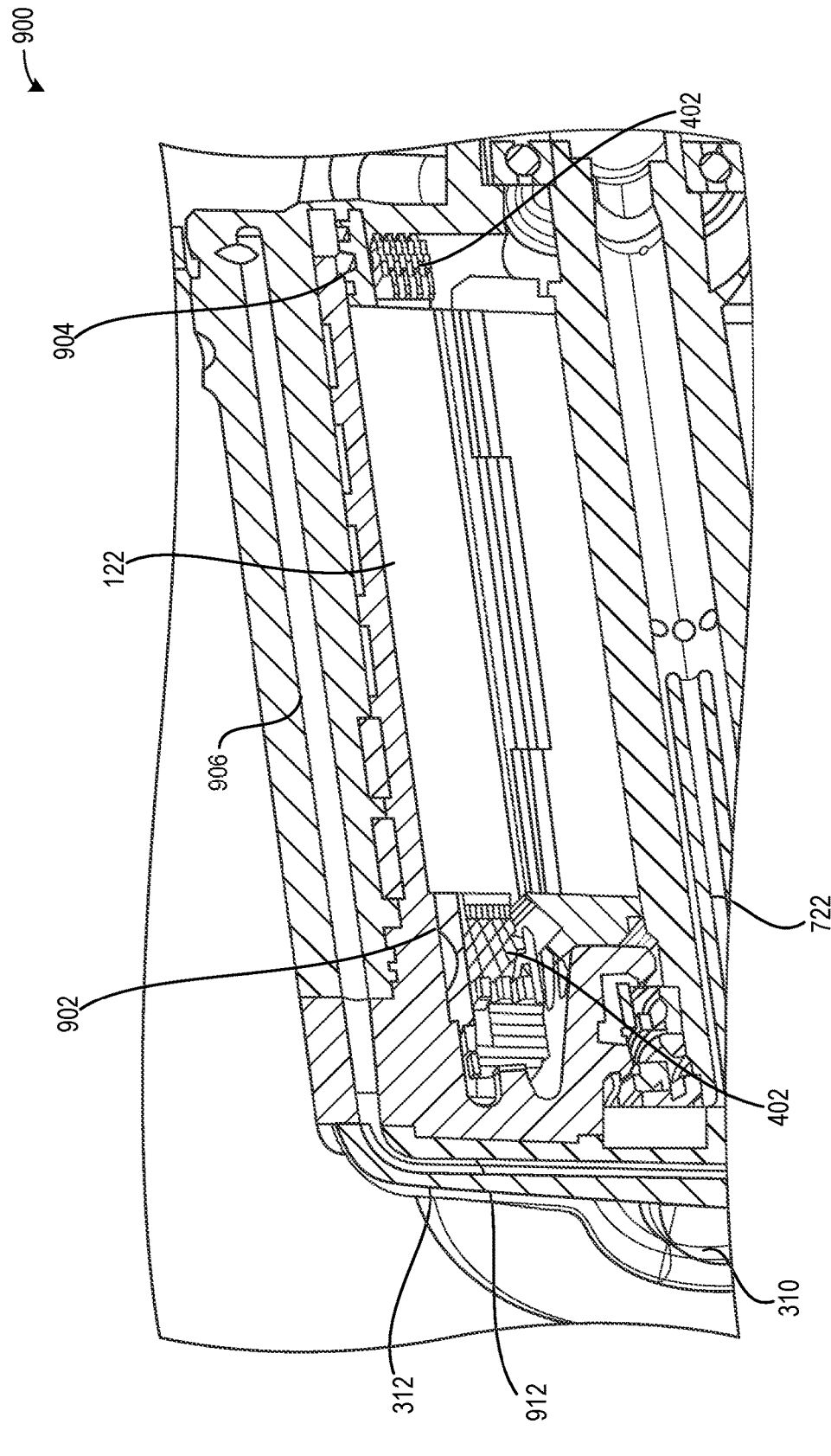
FIG. 9 shows a view of polymer cooling rings proximal to windings of the stator.

FIG. 9 shows a view 900 showing stator end windings 402 radially between a spray ring and a rotor endplate, according to embodiments. As shown, the coolant feed manifold 310 provides a channel for supplying cooling oil up into the carrier for supply of one or both cooling rings 902 and 904. As shown, a first channel 906 runs axially across the carrier and includes auxiliary channels for supplying cooling oil into both the first cooling ring 902 and the second cooling ring 904, wherein the first cooling ring 902 is closer to the coolant feed manifold 310 than the second cooling ring 904. The first channel 906 may be fluidly coupled to a radial arm passage 912. The radial arm passage 912 may flow coolant to each of the first channel 906 and a second channel, wherein the second channel is identical to the rotor shaft passage 722. The first channel 906 and the rotor shaft passage 722 are parallel to one another and extend in an axial direction.

Figure 10:
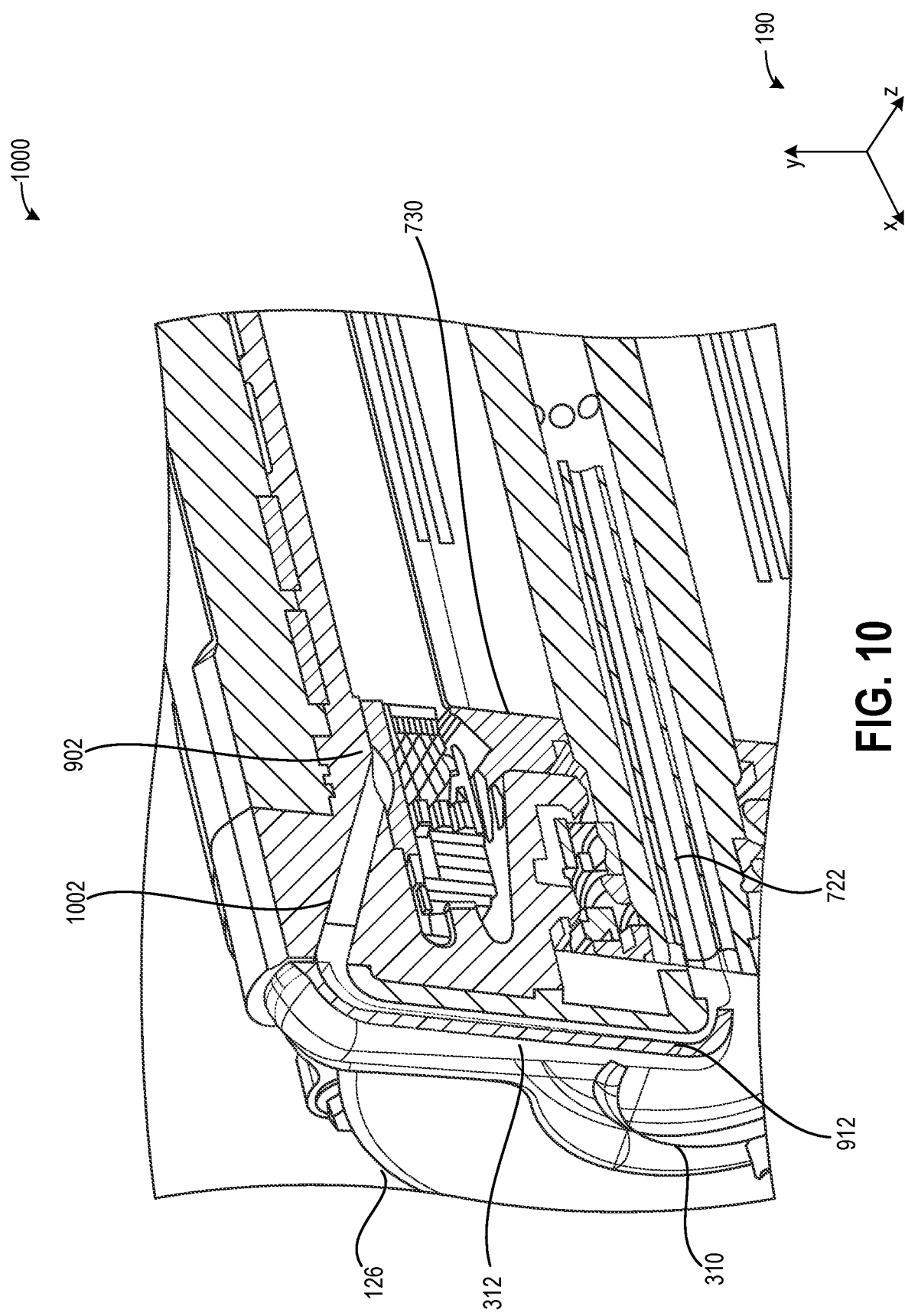
FIG. 10 shows the coolant manifold including coolant channels coupled to an upper portion of a spray ring and into an axial shaft of the rotor.

FIG. 10 illustrates a detailed view 1000 of the first cooling ring 902 adjacent to the radial arm 312 and the rotor end plate 730. The holes in the cooling rings are sized and oriented so as to spray cooling oil onto the outer diameter of the end windings (or head OD) of the stator 122. The oil then gravitationally flows down into the sump system below the rotor and stator. Also shown in FIGS. 10 and 11) are channels through which cooling oil is supplied directly into the rotor shaft, through radially oriented passages that then connect to channels extending axially (in a number of channels positioned across the circumference of the rotor) which end with the holes in the rotor end plates so that the oil sprays outward and preferably is directed to the end windings inner diameter (head ID) so as to further cool the stator end windings. The oil exiting the rotor end plates and onto the stator end windings then gravitationally flows downward into the motor sump system.

The radial arm passage 912 may flow coolant to an angled passage 1002 fluidly coupled to the first cooling ring 902. The radial arm passage 912 may thus be bifurcated and configured to flow coolant to each of the angled passage 1002 and the first passage 906 at a radially outer end. The radial arm passage 912 may be further configured to flow coolant to the rotor shaft passage 722 at a radially inner end.

FIG. 10 shows a view 1000 illustrating the end mounted coolant feed manifold with coolant channels to a top of the spray ring and into the axial shaft of the rotor at a first end, according to embodiments.

Figure 11:
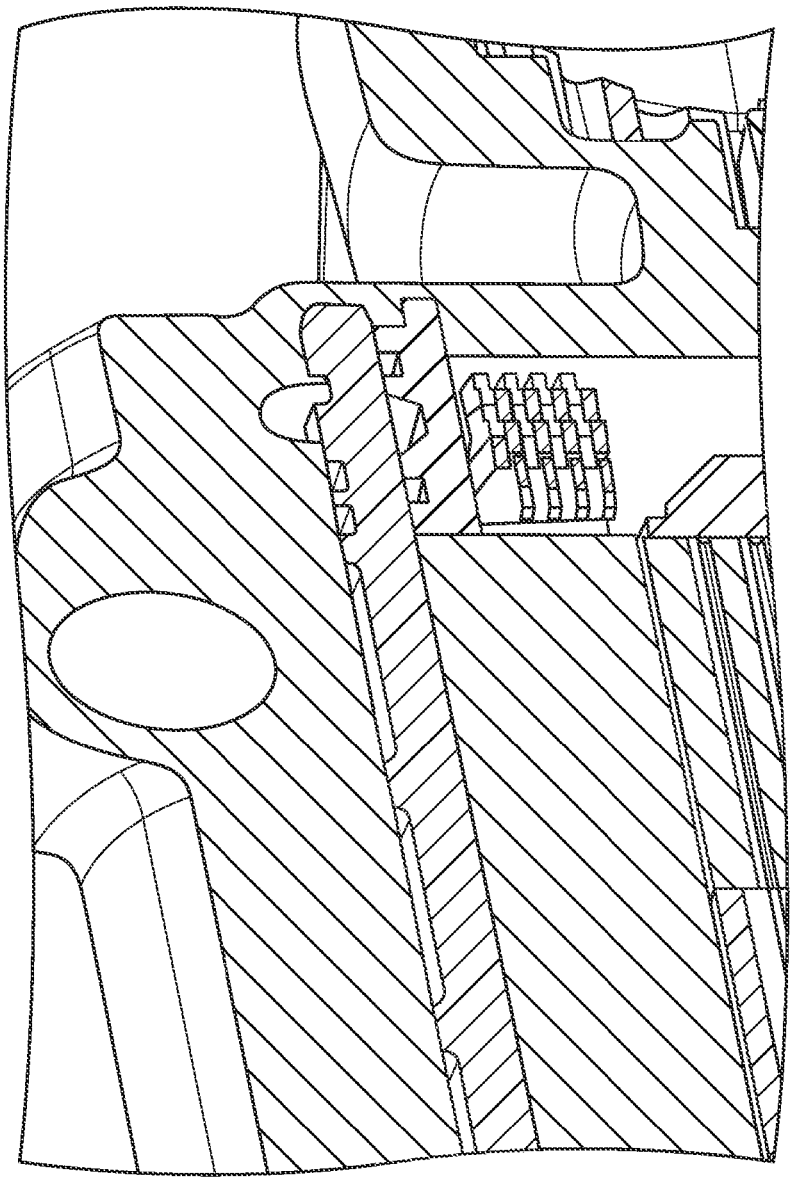
FIG. 11 shows an opposite end of the electric motor distal to the coolant manifold.

FIG. 11 shows a view 1100 illustrating the end mounted coolant feed manifold with coolant channels to a top of the spray ring and into the axial shaft of the rotor at a second end, opposite the first end, according to embodiments.

FIG. 12 shows an enlarged detail view 1200 of a spray ring 1202, which may be identical to the first spray ring 902 or the second spray ring 904 of FIG. 9, according to embodiments. As shown, the spray ring 1202 comprises at least one channel (formed between an exterior surface/outside diameter surface and the inner surface of the cooling jacket) and comprises a plurality of orifices 1204 or holes through which cooling oil may be sprayed and directed toward the end windings of the stator. The plurality of orifices 1204 may extend around a portion of the circumference of the spray ring 1202. In one example, the plurality of orifices 1204 extend around less than half the circumference of the spray ring 1202. Additionally or alternatively, the plurality of orifices 1204 may extend around an entirety of the circumference of the spray ring 1202.

The plurality of orifices 1204 may be configured to spray lubricant toward an outer diameter of the rotor end windings. Additionally or alternatively, the plurality of orifices 1204 may include a uniform flow through area. In other examples, the plurality of orifices 1204 may include a non-uniform flow through area configured to accelerate lubricant flow toward the end windings.

FIGS. 1-4 and 6-12 are shown approximately to scale. However, other relative dimensions may be used if desired.

FIGS. 1-4 and 6-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The disclosure provides support for an electric axle including an electric motor having a stator and a rotor, a coolant manifold mounted to an end plate of the rotor, wherein the coolant manifold is configured to flow coolant to rotor coolant lines extending axially through the rotor, and a spray ring comprising coolant lines coupled to the coolant manifold, wherein coolant flowing from the coolant manifold to the spray ring flows in a direction angled to an axial direction, wherein the spray ring is positioned circumferentially about axial stator end windings. A first example of the electric axle further includes where the coolant manifold is pressed into a cooling jacket. A second example of the electric axle, optionally including the first example, further includes where the coolant jacket comprises circumferentially oriented ribs. A third example of the electric axle, optionally including one or more of the previous examples, further includes where the spray ring is a first spray ring, further comprising a second spray ring arranged at an end of the rotor opposite the first spray ring and distal to the coolant manifold, and wherein the first spray ring and the second spray ring direct coolant toward an outer diameter of the end windings. A fourth example of the electric axle, optionally including one or more of the previous examples, further includes where the coolant manifold is fluidly coupled to a rotor channel arranged in a shaft of the rotor, wherein the rotor channel extends to a mid-point of the shaft and flows coolant to an inner axial channel radially distal to the rotor channel via radial channels. A fifth example of the electric axle, optionally including one or more of the previous examples, further includes where the end plate is a first end plate arranged at a first end of the rotor proximal to the coolant manifold, further comprising a second end plate arranged at a second end distal to the coolant manifold, wherein the first end plate and the second end plate spray coolant toward an inner diameter of the end windings. A sixth example of the electric axle, optionally including one or more of the previous examples, further includes where the coolant manifold is fluidly coupled to an outer axial channel arranged between the stator and a housing of the electric motor. A seventh example of the electric axle, optionally including one or more of the previous examples, further includes where the coolant manifold extends outside of a housing of the electric motor.

The disclosure further provides support for a system including an electric axle, an electric motor including a stator and a rotor arranged in a housing, a coolant manifold inserted through a first end cap of the rotor, wherein the coolant manifold is fluidly coupled to a first channel arranged between a cooling jacket and the stator and a second channel arranged in a rotor shaft, the coolant manifold comprising a radial arm extending from a center of the coolant manifold to the second channel, and a first spray ring arranged adjacent to the coolant manifold and the first end cap and a second spray ring arranged adjacent to a second end cap, the second end cap arranged at an end of the rotor opposite the first end cap, the first spray ring and the second spray ring configured direct coolant from the first channel and the second channel to an outer diameter of stator end windings. A first example of the system further includes where the radial arm comprises a bifurcated channel configured to flow coolant to each of the second channel and the first spray ring. A second example of the system, optionally including the first example, further includes where an angled passage extends from the first spray ring to the bifurcated channel. A third example of the system, optionally including one or more of the previous examples, further includes where a motor sump system configured to receive coolant that has been flowed onto the stator end windings, the sump system comprising a pump for returning the coolant to a heat exchanger, whereafter the coolant returns to the coolant manifold. A fourth example of the system, optionally including one or more of the previous examples, further includes where the coolant manifold is arranged outside of the housing. A fifth example of the system, optionally including one or more of the previous examples, further includes where the second channel extends to a mid-section of the shaft, and wherein a remainder of the shaft is solid. A sixth example of the system, optionally including one or more of the previous examples, further includes where the second channel comprises connecting passages that direct coolant radially outward to an inner axial channel fluidly coupled to the first end plate and the second end plate. A seventh example of the system, optionally including one or more of the previous examples, further includes where the first end plate and the second end plate spray coolant to an inner diameter of the rotor end windings.

The disclosure further provides support for an electric axle including an electric motor having a stator and a rotor, rotor coolant lines extending axially through the rotor so as to receive coolant via an end mounted coolant manifold and flow the coolant axially within the rotor to radially directed flow lines which connect with coolant heat transfer lines running axially along radially outward channels within the radially outward portion of the rotor so as to transfer heat therefrom, the radially outward rotor channels flowing coolant axially toward the axial ends of the rotor, and out of the rotor ends via directed flow orifices, directing coolant onto axial end windings of the stator, spray ring coolant lines feeding coolant to coolant spray rings positioned circumferentially about each of the axial stator end windings, the coolant spray rings receiving coolant from coolant lines within an electric motor carrier or carrier coolant manifold, the carrier coolant manifold further configured to transfer heat from the radially outward circumferential surfaces of the stator core, and the spray rings receiving coolant and flowing the coolant out of the interior circumference of the spray rings via spray ring directed flow orifices, directing coolant onto axial end windings of the stator, and a motor sump system configured to receive coolant that has been flowed onto the stator end windings, the sump system having a pump for returning the coolant to a heat exchanger, whereafter the coolant returns to the coolant manifold. A first example of the electric axle further includes where the end mounted coolant manifold is coupled to a coolant jacket physically coupled to the rotor. A second example of the electric axle, optionally including the first example, further includes where the end mounted coolant manifold comprises a spray arm extending from a center of the end mounted coolant manifold to a bifurcated passage. A third example of the electric axle, optionally including one or more of the previous examples, further includes where the bifurcated passage directs coolant to a radially outward channel and an angled channel, wherein the radially outward channel is arranged between the stator and the carrier, and wherein the angled channel sprays coolant onto an outer diameter of the axial end windings.

The disclosure further provides support for an electric axle including an electric motor having a stator and a rotor, a coolant manifold mounted to an end plate of the rotor, wherein the coolant manifold is configured to flow coolant to rotor coolant lines extending axially through the rotor, and a first spray ring arranged adjacent to the coolant manifold and a second spray ring arranged distally to the coolant manifold, wherein the first spray ring receives coolant from the coolant manifold via an interior passage and the second spray ring receives coolant from the coolant manifold via an outer passage. A first example of the electric axle further includes where the first spray ring and the second spray ring are identical. A second example of the electric axle, optionally including the first example, further includes where the first spray ring and the second spray ring comprise a plurality of orifices extending around a circumference of the first spray ring and the second spray ring. A third example of the electric axle, optionally including one or more of the previous examples, further includes where the plurality of orifices extends around less than half the circumference of the first spray ring and the second spray ring. A fourth example of the electric axle, optionally including one or more of the previous examples, further includes where the plurality of orifices is arranged on only an upper portion of the first spray ring and the second spray ring. A fifth example of the electric axle, optionally including one or more of the previous examples, further includes where the first spray ring and the second spray ring comprise a channel arranged between opposite edges. A sixth example of the electric axle, optionally including one or more of the previous examples, further includes where the interior passage is angled relative to a radial and an axial direction, and wherein the outer passage is parallel to the axial direction. A seventh example of the electric axle, optionally including one or more of the previous examples, further includes where the first spray ring and the second spray ring are configured to spray coolant onto an outer diameter of stator end windings. An eighth example of the electric axle, optionally including one or more of the previous examples, further includes where an inner diameter of stator end windings is sprayed with coolant via end plates of the rotor, wherein the end plate is one of the end plates.

The disclosure further provides support for a system including an electric axle, an electric motor including a stator and a rotor arranged in a housing, a coolant manifold inserted through a first end cap of the rotor, wherein the coolant manifold is fluidly coupled to a first passage arranged in a rotor shaft and a second passage arranged between a cooling jacket and the stator, the coolant manifold comprising a radial arm extending from a center of the coolant manifold to the second channel, and a first spray ring arranged adjacent to the coolant manifold and the first end cap and a second spray ring arranged adjacent to a second end cap, the second end cap arranged at an end of the rotor opposite the first end cap, the first spray ring and the second spray ring configured direct coolant from the second channel to an outer diameter of stator end windings via a plurality of orifices. A first example of the system further includes where the second passage is angled relative to a radial direction and an axial direction. A second example of the system, optionally including the first example, further includes where the first passage is parallel to the axial direction. A third example of the system, optionally including one or more of the previous examples, further includes where the first spray ring and the second spray ring are pressed against an interior surface of the coolant jacket, wherein the coolant manifold is inserted into an opening of the coolant jacket. A fourth example of the system, optionally including one or more of the previous examples, further includes where the plurality of orifices is arranged on only an upper portion of the first spray ring and the second spray ring. A fifth example of the system, optionally including one or more of the previous examples, further includes where each of the plurality of orifices comprises a uniform cross-sectional flow through area. A sixth example of the system, optionally including one or more of the previous examples, further includes where the plurality of orifices is arranged at a bottom of a recess of the first spray ring and the second spray ring.

The disclosure further provides support for an electric axle including an electric motor having a stator and a rotor, rotor coolant lines extending axially through the rotor so as to receive coolant via an end mounted coolant manifold and flow the coolant axially within the rotor to radially directed flow lines which connect with coolant heat transfer lines running axially along radially outward channels within the radially outward portion of the rotor so as to transfer heat therefrom, the radially outward rotor channels flowing coolant axially toward the axial ends of the rotor, and out of the rotor ends via directed flow orifices, directing coolant onto axial end windings of the stator, spray ring coolant lines feeding coolant to coolant spray rings positioned circumferentially about each of the axial stator end windings, the coolant spray rings receiving coolant from coolant lines within an electric motor carrier or carrier coolant manifold, the carrier coolant manifold further configured to transfer heat from the radially outward circumferential surfaces of the stator core, and the spray rings receiving coolant and flowing the coolant out of the interior circumference of the spray rings via spray ring directed flow orifices, directing coolant onto axial end windings of the stator, the spray ring coolant lines including an angled passage coupled to a first spray ring and an outer radial passage coupled to a second spray ring, and a motor sump system configured to receive coolant that has been flowed onto the stator end windings, the sump system having a pump for returning the coolant to a heat exchanger, whereafter the coolant returns to the coolant manifold. A first example of the electric axle further includes where the first spray ring and the second spray ring comprise a recess arranged between outer edges, and wherein a plurality of orifices is arranged at a bottom of the recess. A second example of the electric axle, optionally including the first example, further includes where the recess extends around an entire circumference of the first spray ring and the second spray ring, and wherein the plurality of orifices extends around less than half a circumference of the first spray ring and the second spray ring. A third example of the electric axle, optionally including one or more of the previous examples, further includes where each of the plurality of orifices is identical.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle comprising:
   an electric motor having a stator and a rotor;
   an end mount oil manifold directly coupled to a cooling jacket and removably coupled to a housing via a plurality of fasteners;
   wherein the end mount oil manifold includes:
     a radial arm in direct fluidic communication with a rotor shaft passage and an angled passage that is in direct fluid communication with a first spray ring and is angled downward toward an axis of rotation of the rotor;
   a sump configured to receive oil from the stator end windings;
   a water to oil heat exchanger configured to receive oil from a pump that is positioned in the sump and a water based coolant from coolant lines;
   wherein the coolant lines are in fluidic communication with the cooling jacket and a vehicle cooling system;
   a gear train directly connected to the electric motor;
   a differential directly connected to the gear train of a drive shaft of the electric motor, wherein the drive shaft drives half shafts and wheels ends of the electric axle; and
   wherein the housing at least partially encloses the electric motor, the gear train, the cooling jacket, and the differential;
   wherein the sump is formed in the housing;
   wherein the first spray ring comprises a plurality of orifices that extend around a portion of a circumference of the first spray ring and are configured to direct oil at an outer diameter of stator end windings;
   wherein the rotor shaft passage is in fluidic communication with rotor end plates that direct oil towards an inner diameter of the stator end windings; and
   wherein the cooling jacket includes circumferential oriented ribs that are in face sharing contact with an inner surface of the housing to form coolant channels; and
   an inverter directly coupled to the housing and electrically coupled to the stator.

2. The electric axle of claim 1, wherein the oil manifold is pressed into the cooling jacket.

3. The electric axle of claim 1, further comprising a second spray ring arranged at an end of the rotor opposite the first spray ring and distal to the oil manifold, and wherein the first spray ring and the second spray ring direct oil toward an outer diameter of the end windings.

4. The electric axle of claim 1, wherein the rotor shaft passage extends to a mid-point of the rotor shaft and flows the oil to multiple radial channels.

5. The electric axle of claim 4, wherein the oil manifold is fluidly coupled to an outer axial channel arranged between the stator and a housing of the electric motor.

6. The electric axle of claim 1, wherein the sump comprises a pump in fluidic communication with the water to oil heat exchanger.

7. An electric axle system, comprising:
   an electric motor including a stator and a rotor arranged in a housing;
   a gear train rotationally coupled to the electric motor and a differential;
   an end mount oil manifold directly coupled to a cooling jacket and removably coupled to a housing via a plurality of fasteners;
   wherein the end mount oil manifold includes:
     a radial arm in direct fluidic communication with a rotor shaft passage and an angled passage that is in direct fluid communication with a first spray ring and is angled downward toward an axis of rotation of the rotor;
   wherein the first spray ring includes multiple orifices that direct oil to stator end windings;
   a gear train directly connected to the electric motor;
   a differential directly connected to the gear train of a drive shaft of the electric motor, wherein the drive shaft drives half shafts and wheels ends of the electric axle; and
   wherein housing at least partially encloses the electric motor, the gear train, the cooling jacket, and the differential;
   a sump configured to receive oil from the stator end windings; and
   a water to oil heat exchanger configured to receive oil from a water to oil heat exchanger configured to receive oil from a pump that is positioned in the sump and a water based coolant from coolant lines;
   wherein the coolant lines are in fluidic communication with the cooling jacket and a vehicle cooling system;
   wherein the sump is formed in the housing; and
   wherein the cooling jacket includes circumferential oriented ribs that are in face sharing contact with an inner surface of the housing to form coolant channels; and
   an inverter directly coupled to the housing and electrically coupled to the stator.

8. The system of claim 7, wherein the radial arm comprises a bifurcated channel configured to flow oil to each of a channel and the first spray ring.

9. The system of claim 8, wherein an angled passage extends from the first spray ring to the bifurcated channel.

10. The system of claim 7, wherein the sump comprises a pump configured to return the oil to a heat exchanger, whereafter the oil returns to the oil manifold.

11. The system of claim 7, further comprising a gear train rotationally coupled to the electric motor and a differential rotationally coupled to the gear train.

12. The system of claim 7, wherein the second channel extends to a mid-section of the shaft, and wherein a remainder of the shaft is solid.

13. The system of claim 12, wherein the second channel comprises connecting passages that direct oil radially outward to an inner axial channel fluidly coupled to a first end plate and a second end plate.

14. The system of claim 13, wherein the first end plate and the second end plate spray oil to an inner diameter of the stator end windings.

15. An electric axle comprising:
   an electric motor having a stator and a rotor;
   a gear train rotationally coupled to the electric motor and a differential;
   a differential directly connected to the gear train of a drive shaft of the electric motor, wherein the drive shaft drives half shafts and wheels ends of the electric axle; and
   an end mount oil manifold directly coupled to a cooling jacket and removably coupled to a housing via a plurality of fasteners;

wherein the housing at least partially encloses the electric motor, the gear train, the cooling jacket, and the differential;

wherein the end mount oil manifold includes:
  a radial arm in direct fluidic communication with a rotor shaft passage and an angled passage that is in direct fluid communication with a first spray ring and is angled downward toward an axis of rotation of the rotor;
  a sump configured to receive oil from the stator end windings; and
  a water to oil heat exchanger configured to receive;
    oil from a pump that is positioned in the sump; and
    a water based coolant from coolant lines;
wherein the coolant lines are in fluidic communication with the cooling jacket and a vehicle cooling system;
wherein the sump is formed in the housing;
wherein the first spray ring comprises a plurality of orifices that extend around a portion of a circumference of the first spray ring and are configured to direct oil at an outer diameter of stator end windings; and
wherein the rotor shaft passage is in fluidic communication with rotor end plates that direct oil towards an inner diameter of the stator end windings;
wherein the cooling jacket includes circumferential oriented ribs that are in face sharing contact with an inner surface of the housing to form coolant channels; and
an inverter directly coupled to the housing and electrically coupled to the stator.

16. The electric axle of claim 15, wherein the oil manifold is coupled to a cooling jacket physically coupled to the rotor and surrounding the stator.

17. The electric axle of claim 15, wherein the arm extends from a center of the oil manifold to a bifurcated passage.

18. The electric axle of claim 17, wherein the bifurcated passage directs oil to a radially outward channel and an angled channel, wherein the radially outward channel is arranged between the stator and the carrier, and wherein the angled channel sprays oil onto an outer diameter of the stator end windings.

* * * * *